United States Patent [19]

Vanderhoof

[11] Patent Number: 5,595,432

[45] Date of Patent: *Jan. 21, 1997

[54] LIGHTING FIXTURE

[75] Inventor: Troy Vanderhoof, Plano, Tex.

[73] Assignee: Gulton Industries, Inc., Plano, Tex.

[ * ] Notice: The term of this patent shall not extend beyond the expiration date of Pat. No. 5,420,763.

[21] Appl. No.: 396,166

[22] Filed: Feb. 27, 1995

Related U.S. Application Data

[63] Continuation of Ser. No. 988,251, Dec. 10, 1992, Pat. No. 5,420,763, which is a continuation-in-part of Ser. No. 961,777, Oct. 15, 1992, abandoned.

[51] Int. Cl.$^6$ ........................................................ B60Q 3/02
[52] U.S. Cl. ........................... 362/74; 362/219; 362/221; 362/260
[58] Field of Search ............................. 362/74, 151, 149, 362/150, 219, 221, 222, 260; 40/553, 556

[56] References Cited

U.S. PATENT DOCUMENTS 3,375,322  3/1968  Serio et al. ........................ 362/219 X
3,619,602  11/1971  Wilde .................................... 362/219
5,226,724  7/1993  Kanarek ............................ 362/219 X
5,420,763  5/1995  Vanderhoof .............................. 362/74

Primary Examiner—Stephen F. Husar
Attorney, Agent, or Firm—Darby & Darby

[57] ABSTRACT

A fighting fixture disclosed is designed for installation in a cove of a public transit vehicle providing ready access to a space behind it, without requiring a variety of specially designed fixtures for special access requirements. The fixture comprises a pair of battens extending generally vertically to support the fixture, a longitudinally extending card panel supported in movable relationship by the battens and having a groove adapted to mount an advertisement card, a socket connected to each of the battens cooperating to mount a fluorescent lamp, and a bezel supported by the battens and supporting a lens covering the mounted lamp. Access to the space is obtained by releasing a lower edge of the card panel and rotating it about pivot pins to an open position. Similarly, the bezel is pivoted to provide access to the mounted lamp. An advertisement car card placed on the card panel is retained at a lower edge by the card panel throughout the pivotal displacement of the panel. An elongated lighting fixture may be formed by supporting additional panels by the battens in movable relationship thereto.

3 Claims, 6 Drawing Sheets

LIGHTING FIXTURE

This is a continuation of allowed application Ser. No. 988,251, filed Dec. 10, 1992, now U.S. Pat. No. 5,420,763, which is a continuation-in-part of application Ser. No. 961,777, filed Oct. 15, 1992, now abandoned.

BACKGROUND OF THE INVENTION

The present invention relates in general to cornice lighting fixtures for use in public transit vehicles, and more particularly, to an improved lighting fixture for installation in a cove or cornice of a vehicle and which provides access to the air duct region between the fixture and vehicle body, while illuminating and retaining an advertising car card in place.

Several card-carrying cornice lighting fixtures are known in the art. One type of cornice lighting fixture for public transit vehicles is disclosed in U.S. Pat. No. 4,387,415. This fixture is of unitary pultrusion construction and includes a trim panel for holding a car card, integral with a light housing. While this construction is said to satisfy a need for economy of manufacture, this fixture must, however, be custom cut to provide necessary apertures or removed entirely from the vehicle to provide access to an air duct behind the fixture, and such access is generally only available after removing the advertising card.

Another vehicle lighting fixture designed for use in public transit vehicles such as railway cars is disclosed in U.S. Pat. No. 3,035,161. This type includes through-running beams, one on each side of the vehicle, upon which advertising card receptacles are anchored. A card backing plate of this type of fixture is secured by screws at one edge and by a flange at an opposite edge. Access to an enclosed duct behind the card backing plate is provided by removing an advertising card supported on the card backing plate and unfastening the plate.

Yet another vehicle lighting system for illuminating an advertising card as well as for general vehicle illumination is disclosed in U.S. Pat. No. 2,587,807 which is adapted to be installed in the vehicle cornice. The fixture is mounted to a vehicle ceiling surface and to a deck member. The deck member and ceiling define a duct for cables or ventilation.

These references recognize the need to access the fluorescent lamps of the fixtures for replacement purposes and the like, by providing removable lenses or bezels, but they generally do not provide ready access to an enclosed air plenum above the fixture.

Today's public transit vehicles are equipped with sophisticated electrical apparatus to operate lights, bells, buzzers, air conditioners and other complex equipment, all of which must be placed in spaces which do not interfere with the passengers' safety and comfort. The cove formed by the adjacent sidewall and ceiling of such vehicles is uniquely suited to house air ducts, cables, and electrical and mechanical devices. There exists a need to provide ready access to these spaces with minimal delay.

Furthermore, it is desirable to provide such access without resorting to customizing panels with access doors and the like. Additionally, it is desirable to provide such access without disturbing an advertisement card held in the fixture.

SUMMARY OF THE INVENTION

It is an object of the present invention to provide an improved lighting fixture, especially designed for installation in a cove formed by the ceiling and sidewall of a passenger vehicle interior.

Another object is to eliminate the need to customize particular lighting fixture units to provide access to a duct or plenum defined by a combination of the installed lighting fixture and the cove.

Yet another object is to provide a lighting fixture which is pre-wired and shipped as a complete modular unit ready for installation into a bus.

Still another object is to provide a lighting fixture with the foregoing advantages with minimal cost and complexity.

A further object is to provide a lighting fixture with a means for retaining an electrical connector which advantageously permits maintenance and replacement of a plug-in ballast adapted to mate with the connector.

The present invention provides a lighting fixture for passenger vehicles providing ready access to a space behind it, without requiring a variety of specially designed fixtures for special access requirements. Instead, the fixtures of the present invention may be made uniformly for installation and electrical connection throughout the vehicle, permitting access to the air plenum everywhere in the vehicle. Thus, only a single design need be produced instead of a variety of special designs, contributing to lower costs of production.

These and other objects are achieved according to the present invention by providing a lighting fixture of the type designed to support an advertisement card, for use with a fluorescent lamp, which comprises: a pair of battens or supporting struts extending generally vertically to support the fixture; a longitudinally extending card-holder panel supported at each end by the battens in a movable relationship to the battens, the panel having a groove adapted to mount an advertisement card; a socket connected to each of the battens cooperating to mount a fluorescent lamp; and a bezel supported by the battens and supporting a lens or other light distributor covering the mounted lamp. In accordance with an aspect of the present invention, the card panel is pivotally mounted on the battens. As a further feature of the present invention, the bezel is also pivotally mounted on the battens and may assist in retaining the advertisement card. As an additional feature of the present invention, the battens may include a mounting for an electrical connector for engaging a ballast and means for retaining the ballast. A single ballast may be used for two adjoining fixtures.

DESCRIPTION OF THE PREFERRED EMBODIMENTS

The present invention relates to an improved lighting fixture, especially designed for installation in a cove formed by a ceiling and sidewall of a passenger vehicle interior. The present vehicle lighting system is formed by of a plurality of individual elongated lighting fixtures, each fixture being pre-wired and shipped as a complete modular unit ready for installation, which may be installed in a continuous end-to-end or longitudinally spaced manner along opposed sides of a central passenger aisle of a vehicle compartment. An air plenum or air duct is often defined between the lighting fixture and the vehicle wall. This space may be employed to house electrical cables or as a duct to distribute heated or cooled air, or to house mechanisms such as door closures.

Figure 1:
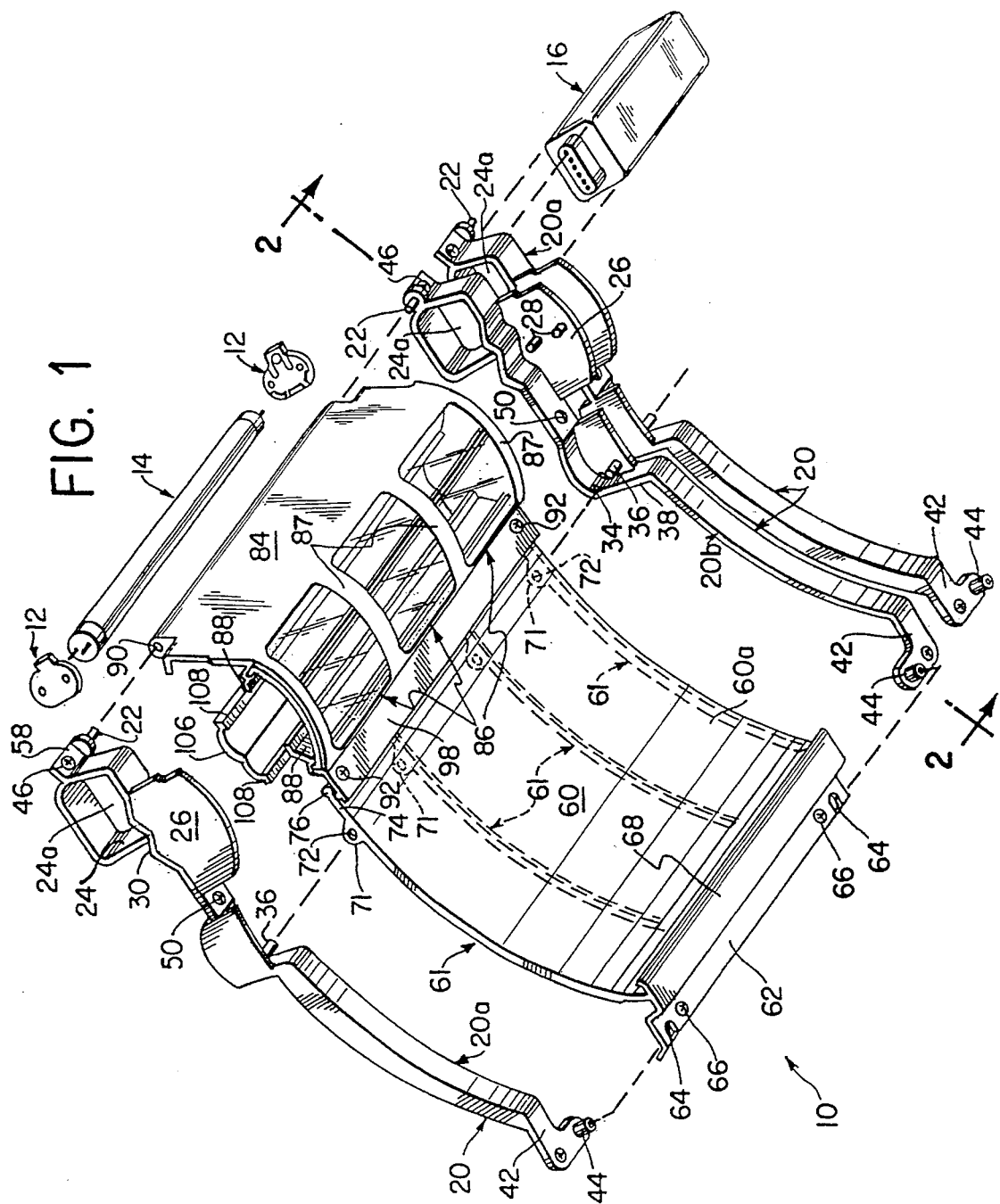
FIG. 1 is a perspective view of a first embodiment of a lighting fixture according to the present invention.
Figure 2:
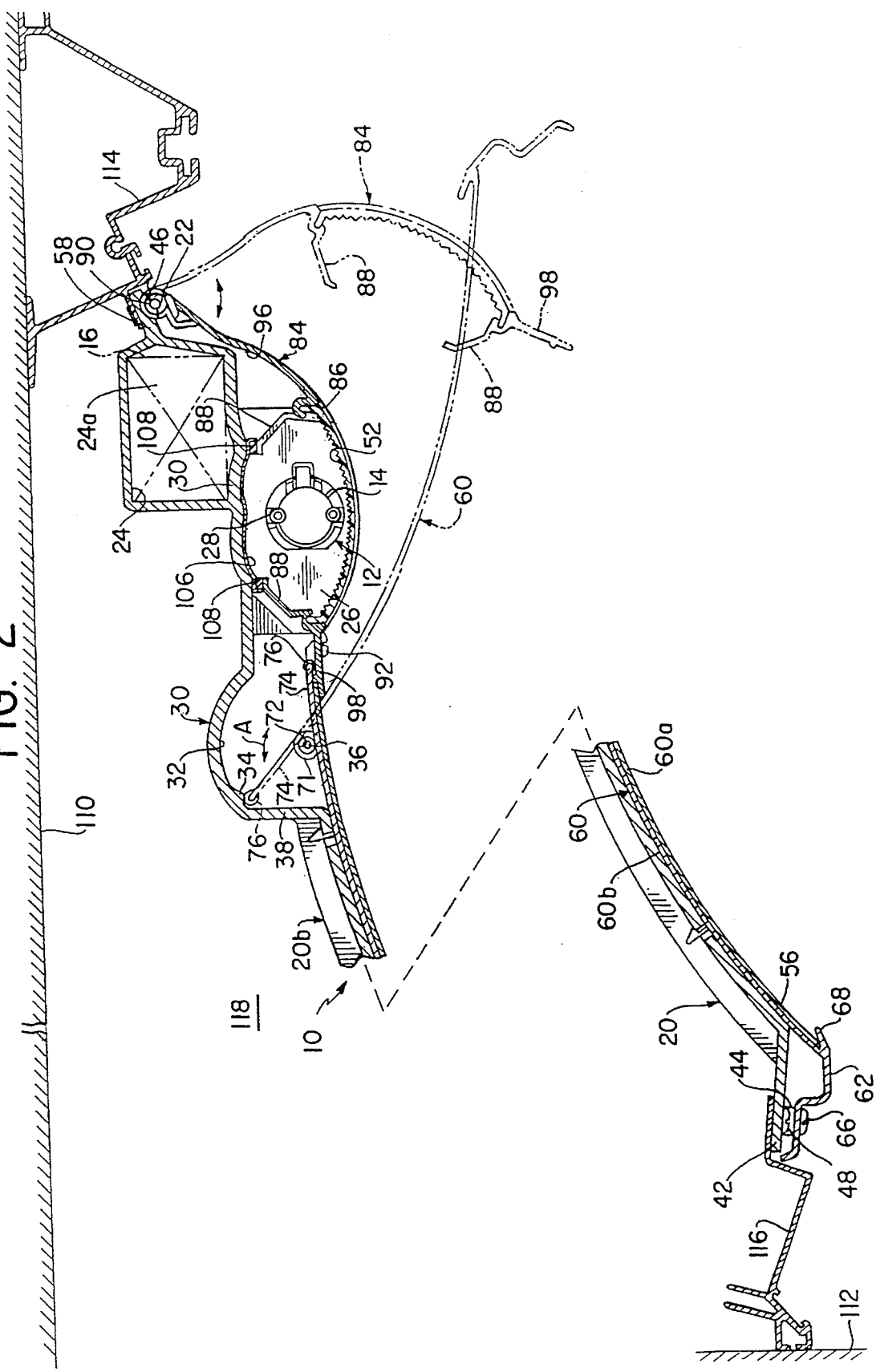
FIG. 2 is a sectional view along line 2—2 of FIG. 1.

As illustrated in FIGS. 1 and 2, the lighting fixture 10 of the present invention comprises a pair of left and right hand battens 20a, 20b, respectively, for pivotally mounting both a card panel 60, which selectively covers or provides access to the air plenum or cove 118 formed by vehicle ceiling 110 and sidewall 112, and a bezel 84 disposed above the card panel 60, which selectively covers or provides access to a light socket and lamp assembly 12,14. Bezel 84 is formed to hold a lens or diffuser 52 which diffuses or directs light from the light tube into the vehicle passenger compartment and onto the card carded by the card panel 60. The light fixture is formed by a unitary assembly of a left hand batten 20a and a fight hand batten 20b, each carrying a light socket 12, and a pivotally secured card panel 60 and bezel 84. A reflector 106 may also be part of the assembly. This assembly may then be secured to the vehicle merely by affixing the battens to the vehicle ceiling and side wall, with an air plenum 118 formed by the space between the vehicle and fixture. The right hand batten of one fixture and the left hand batten of another fixture may be installed in the vehicle adjacent to each other to provide a longitudinally continuous cornice lighting fixture structure along the length of the vehicle.

Figure 7:
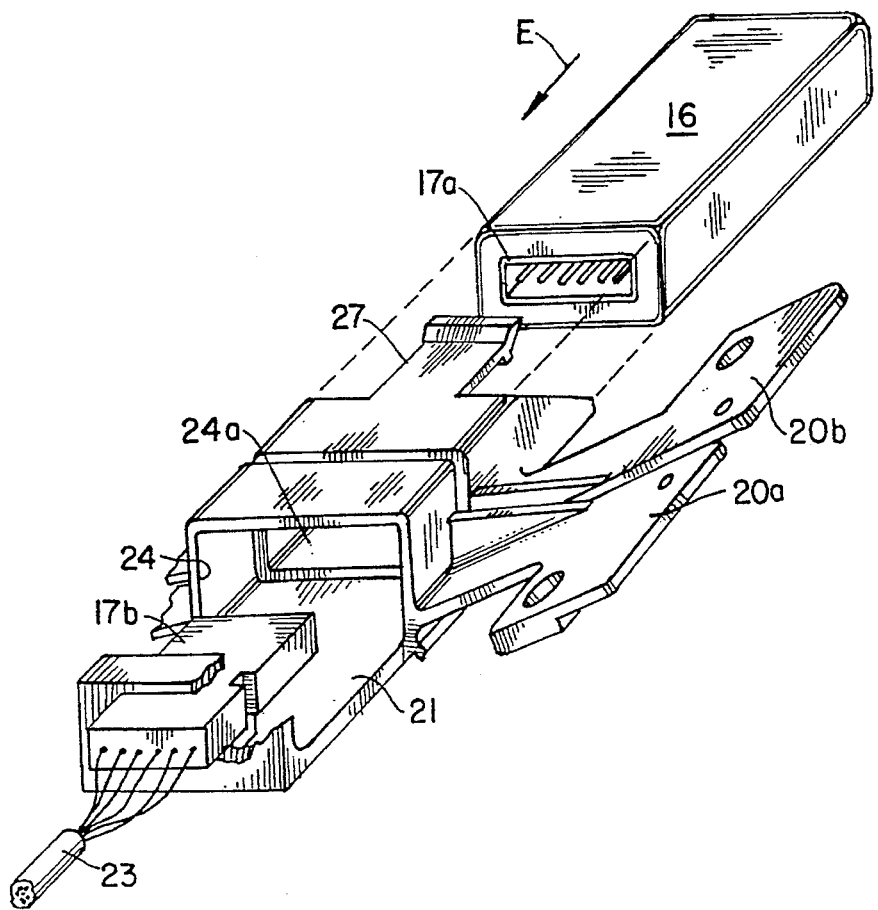
FIG. 7 is an enlarged view of one end of a pair of battens of two adjoining lighting fixtures constructed in accordance with the present invention.

Left hand batten 20a may be formed with an extension 21 having a mounting for an electrical connector 17b which is wired to the light socket and lamp assembly 12, 14, as shown in FIG. 7. Where two fixtures are juxtaposed end to end, a dual lamp ballast 16 having a mating connector 17a may engage connector 17b to serve both adjoining fixtures. Such an arrangement offers the advantages of fewer ballasts per vehicle resulting in decreased weight and fewer electrical interconnections, resulting in increased electrical reliability. Battens 20a and 20b are otherwise symmetrical and are referred to hereinafter more generally as batten 20.

In a first embodiment shown in FIGS. 1 and 2, access to air plenum 118 is provided by pivoting the card panel 60 outward from the cove formed by the ceiling 110 and the sidewall 112. Card panel 60 has a concave front surface 60a for receiving a car card 56 and a convex rear surface 60b which faces the cove. At each end of card panel 60 is a boss or projection 71 extending rearward from a rib or flange 61 on rear surface 60b and having a pivot hole 72, near its upper edge, adapted to receive a pivot pin or trunnion 36 formed on batten 20.

Card panel 60 is further formed with a resiliently flexible extension flap 74 which is generally planar with front surface 60a and extends beyond boss 71. This extension 74 has a slightly enlarged rounded or bulbous edge 76 adapted, in a manner described below, to support the card panel 60 in an open position to provide access to the air plenum 118.

Panel 60 is supported from each batten 20 by the batten pivot pin 36 which engages the panel boss 71 of an upper edge of the panel 60 and by a screw 66 or other removable securing means passing through a hole in a lower edge of the panel 60 to engage the batten 20 at 44.

In accordance with the invention, access to air plenum 118 is obtained by releasing the lower edge of card panel 60 from the batten 20 and rotating it about pivot pins 36 to an open position shown in phantom lines in FIG. 2. As card panel 60 is pivoted, the bulbous edge 76 of extension flap 74 travels freely through an arc generally defined by the length of flap 74 and pivot pin 36, along an arched surface 32 of batten 20 as shown by arrow A in FIG. 2. Arched surface 32 is formed generally coaxial with pivot pin 36 and has a protuberance 34 formed thereon. As card panel 60 is pivoted to near its fully open position, extension 74 flexes slightly and may be manually urged past one side of protuberance 34 toward an adjacent vertical wall 38 of batten 20, permitting extension 74 to return to its natural unflexed shape. Once extension 74 has passed protuberance 34, bulbous edge 76 is held between projection 34 and wall 38 to support card panel 60 in an open position. Panel 60 may be closed by reversing this operation, allowing extension 74 to flex as it passes over protuberance 34 to return to an unflexed state as the panel 60 is secured at its lower edge to the batten 20.

A car card 56 inserted in card panel 60 is retained by the card panel 60 throughout the panel's pivotal displacement. At an edge of card panel 60 opposite the flexible extension 74, card panel 60 is formed with a connection portion 62 for securing the panel 60 to a batten 20 at each panel end. The panel is formed with a card holder tab or lip 68 forming a groove to hold one edge of the card 56. Thus, as card panel 60 is pivoted about pivot pin 36, a car card 56 placed in the groove 68 is retained on front surface 60a of panel 60 at its bottom edge.

Bezel 84 supports the car card 56 at its top edge. Bezel 84 is formed with a flat edge 98 which overlaps extension 74 of card panel 60, leaving a gap between panel 60 and bezel edge 98 to retain the upper edge of the card 56. When both the card panel 60 and bezel 84 are closed, a car card 56 may be placed in groove 68 at a bottom edge of card 56 and in the cavity formed between panel extension 74 and bezel edge 98 at a top edge of card 56.

Bezel 84 has a boss with a pivot hole 90 formed in each end of its edge opposite the flat edge 98. The pivot hole 90 is arranged to receive a pivot pin or trunnion 22 formed on batten 20. Thus, when bezel 84 is pivoted to an open position, edge 98 separates from card panel 60 and provides access to a lamp 14 and to the top edge of car card 56. When bezel 84 is in a closed position, it can be secured in place by screws 92 inserted into screw holes formed in edge 98 which are arranged to align with and engage threads 50 formed on batten 20.

The lighting fixture of the present invention is further provided with a pair of light sockets 12, preferably of the type described in U.S. Pat. No. 5,261,831, issued Nov. 16, 1993, in the names of M. J. Vendal and L. B. Ruth and assigned to the assignee of the present invention, which cooperate to mount a fluorescent light tube 14. Each batten 20 is formed with a flange 26 having threaded projections or holes 28 for mounting socket 12 to flange 26. A reflector 106 is disposed behind the light tube 14 at a section 30 of batten 20 to direct light from the light tube through the bezel. Reflector 106 may be formed in a concave or double concave shape, as illustrated in FIG. 2. Preferably, reflector 106 is formed with a double generally ellipsoidal trough so that light from light tube 14 focuses onto the car card 56, and also onto the passenger reading plane and floor aisle of the vehicle. Reflector 106 is supported at each end by batten 20. The reflector and the bezel prevent light emanating from the light fixture 10 through apertures 86 from travelling directly onto the vehicle ceiling 110. This reduces one source of driver glare.

The concave inner surface 96 of bezel 84 is formed with longitudinally extending walls 88 projecting inwardly from the inner surface 96. A pair of gasket strips 108 are disposed, respectively, upon each longitudinally extending edge of reflector 106. The outer edges of walls 88 engage gasket strips 108 in the closed position of the bezel to form a seal against dust. Bezel 84 also has a plurality of lens openings or apertures 86 fitted with a transparent or translucent lens or diffuser 52 for appropriately distributing light onto the car card 56 below light tube 14 and generally throughout the passenger vehicle. The bezel may be provided with a single opening extending nearly its full length or with a number of such openings along its length, separated by strips 87 extending between the upper and lower portions of the bezel opening. A separate lens may be associated with each opening, or alternatively, a single lens may overlie the entire sequence of openings. The lenses are preferably extruded of transparent or translucent material with a cross-sectional configuration adopted to distribute light as may be desired over the vehicle passenger compartment and advertising card. The strips or webs 87 between the apertures 86 also function like a louver to baffle linear glare, another source of driver glare, which may otherwise be obtrusive to driver visibility.

As shown in FIGS. 1 and 2, batten 20 is formed with a rectangular sleeve 24a defined by sleeve walls 24 adjacent batten section 30 and is adapted to hold a lamp ballast 16. Where two fixtures are juxtaposed end-to-end, the sleeves 24a of their battens are in register (i.e. in alignment) and may hold a dual-lamp ballast to serve both adjoining fixtures. The ballast may be retained in the sleeve 24a in any suitable manner, such as one or more set screws, or as described more fully in connection with FIG. 7. A longitudinal lip or flange 58 is formed on batten 20 extending beyond sleeve 24a for mounting batten 20 to a bracket or frame member 114 of the vehicle ceiling 110.

Figure 6:
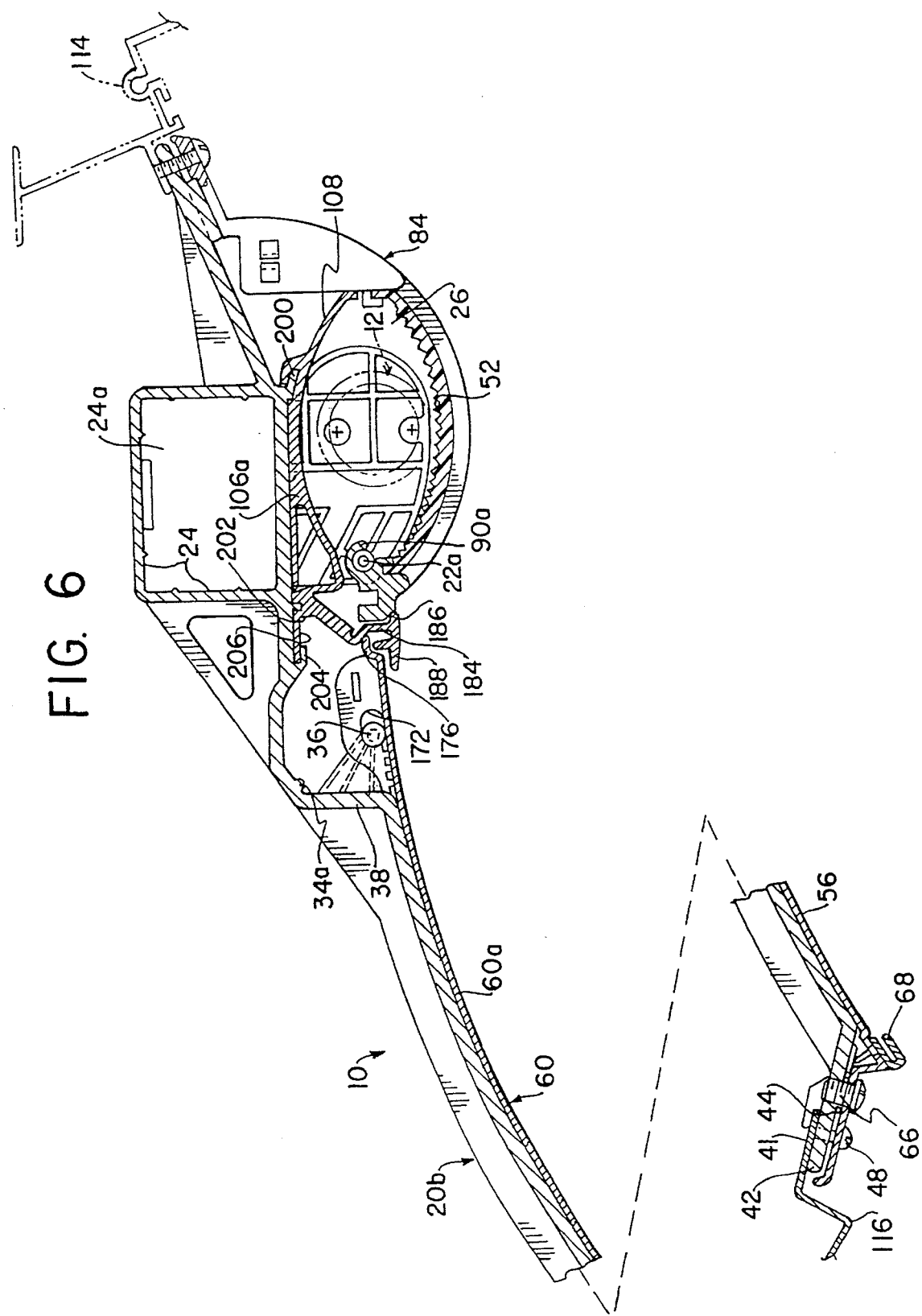
FIG. 6 is a lateral view of a batten constructed in accordance with the present invention.

As seen in FIG. 1, the lower connection portion 62 of card panel 60 is further formed with a hole for a screw 66 and a slot 64 at each end overlying batten 20. Screws 66 are arranged so that when card panel 60 is in its closed position, each screw 66 is aligned with an opening 44 formed on one end of batten 20. Card panel 60 may thereby be secured to batten 20 by suitable securing means, to form a single unit with the bezel and reflector for shipping or installation purposes. Slots 64 are provided to expose screws 48 in batten 20 to permit securing the batten to the vehicle structure, for installing a lighting fixture 10 or an adjoining pair of fixtures as a single unit. Batten 20 is provided with screws 46,48 at upper flange 58 and lower horizontal portion 42, respectively, for attaching the lighting fixture 10 to a pair of frame members or brackets 114,116 mounted to the vehicle ceiling and sidewalls, respectively. Additionally, batten 20 may be formed with a groove 41 at its lower horizontal portion 42 adapted to seat the batten upon bracket 116, as shown in FIG. 6.

Figure 3:
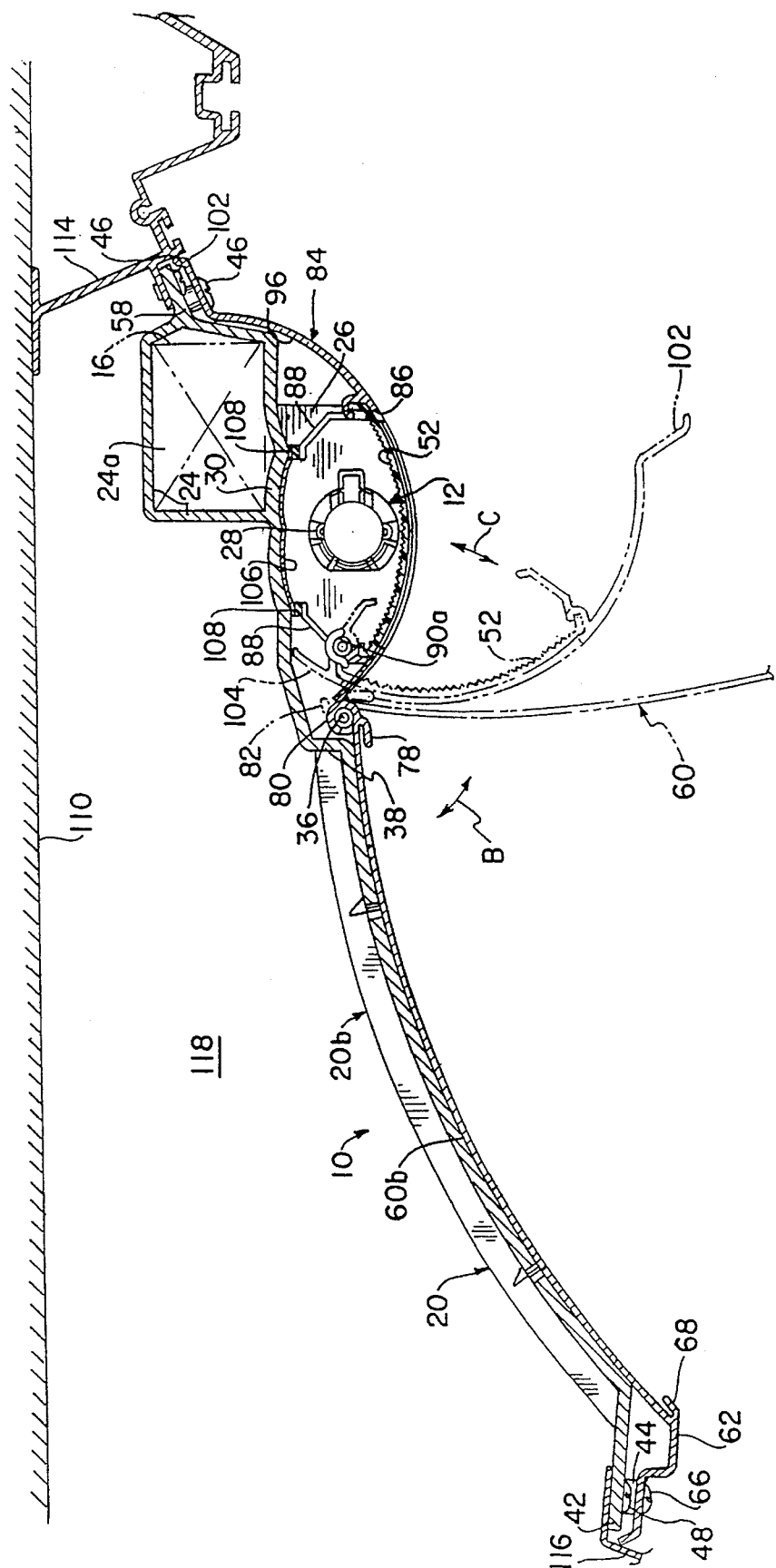
FIG. 3 is a sectional view of a second embodiment of a lighting fixture constructed in accordance with the present invention.

FIG. 3 shows a second embodiment of the present invention, in which features common to the first embodiment are given corresponding reference numerals. Otherwise than as specifically described below, the fixture of FIG. 3 is essentially the same as in FIGS. 1–2.

As in the embodiment of FIGS. 1 and 2, access to air plenum 118 is obtained by pivoting card panel 60 about pivot pin 36 to an open position. Card panel 60 is formed at its upper edge with a loop 80 engaging pivot pin 36 and having a projection 82 extending outwardly from it. As card panel 60 is pivoted, projection 82 rotates about pin 36 toward a generally vertical wall portion 38 of batten 20. Wall 38 is generally perpendicular to card panel 60. Card panel 60 may be pivotally rotated as shown by arrow B until projection 82 bears against wall 38 to provide a stop for panel 60.

As before, a car card 56 inserted in card panel 60 may be retained throughout the pivotal displacement of the panel. A card-holding tab 68 is provided to retain the car card 56 on a bottom edge of the front surface 60a of the card panel 60. The card panel 60 is further provided with an upper card holding tab forming a groove 78 to hold an upper edge of a car card 56.

As shown by arrow C in FIG. 3, bezel 84 is pivotally supported by a pivot pin 22a formed on batten 20 permitting downward swinging of the bezel toward the card panel 60 about the lower edge of the bezel. Bezel 84 is formed with a boss on each end having a pivot hole 90a disposed on a rear surface 96 between lens openings 86 and the bezel left edge as seen in the drawing. A projection 104 extends beyond pivot hole 90 to provide a close fit, when closed, between the card panel 60 and the bezel 84, and also to engage the batten wall in the open bezel position to provide a stop for the pivoting of the bezel. The bezel flange 102 overlaps a flange 58 of batten 20 when the bezel 84 is in a closed position. These flanges are removably secured together, as by screws, to retain the bezel closed.

As before, a reflector 106 is supported at each end by batten 20 and is disposed behind the light tube 14 at a section 30 of batten 20 to direct light from the light tube 14 through the bezel. Reflector 106 is preferably formed with a pair of generally ellipsoidal troughs to direct light and reduce driver glare, as discussed in connection with the previous embodiment.

Figure 4:
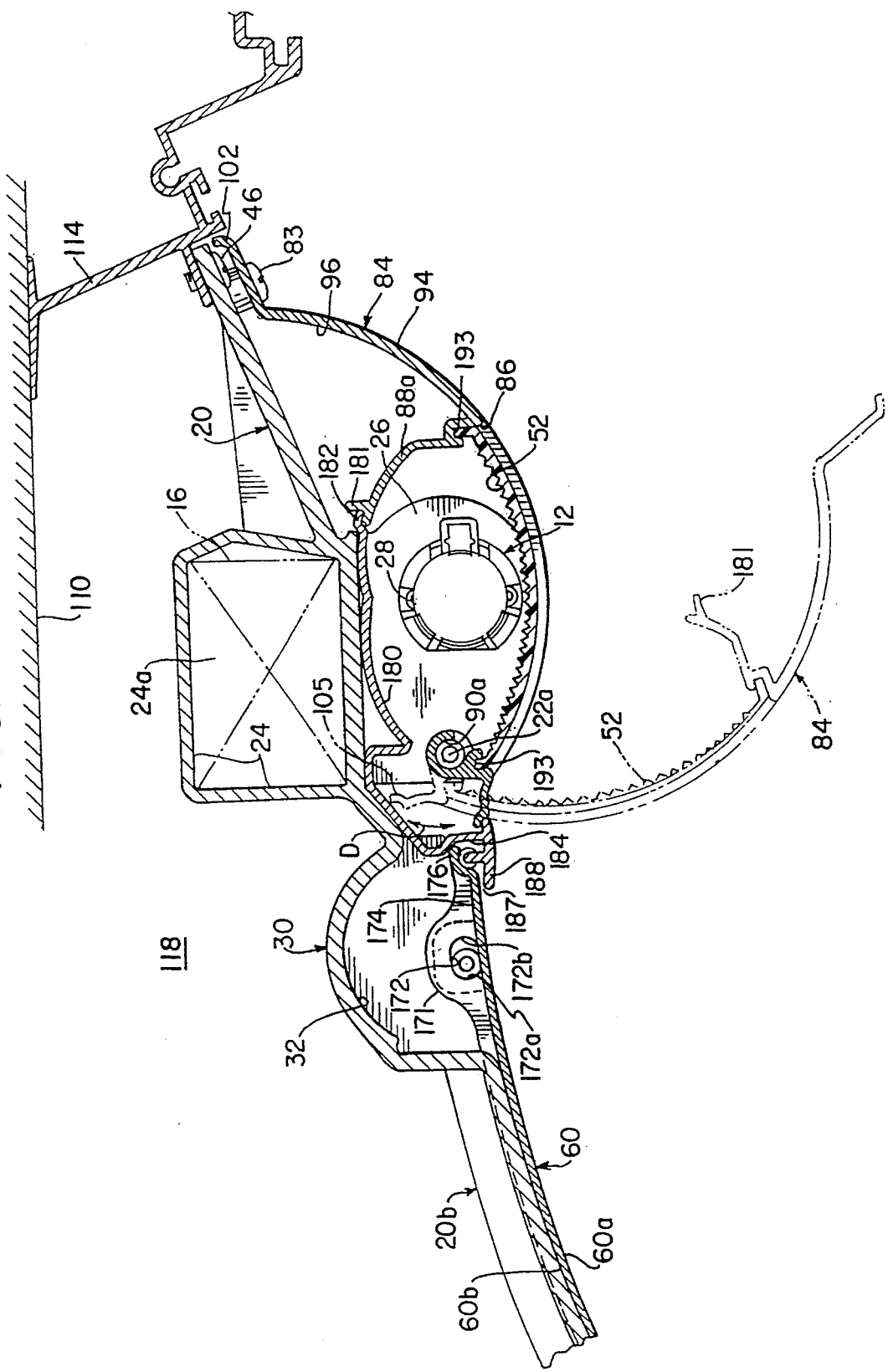
FIG. 4 is a sectional view of a third embodiment of a lighting fixture constructed in accordance with the present invention showing a card panel in a closed position or operating state.
Figure 5:
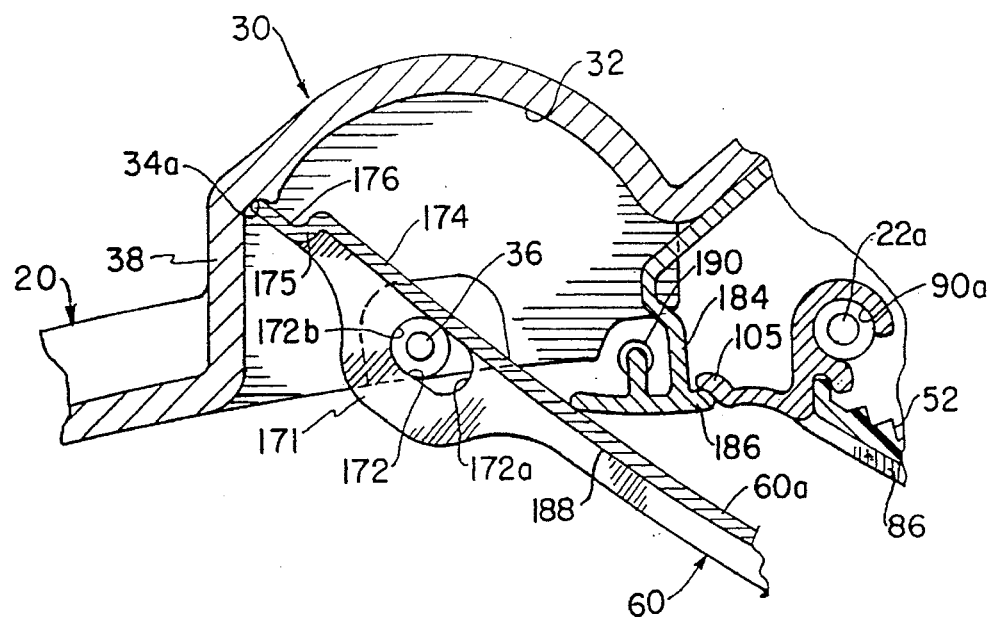
FIG. 5 is an enlarged view of the device of FIG. 4 showing the card panel in an open position.

FIGS. 4 and 5 show a third embodiment of the present invention, in which features common to both the first and second embodiments are denoted with corresponding reference numerals. Otherwise than as specifically described below, the fixture of FIGS. 4 and 5 is essentially the same as in FIGS. 1–3.

Referring to FIGS. 4 and 5, card panel 60 is formed with a boss or projection 171 adjacent each end. Boss 171 has a bore or hole 172 of generally oval cross-section extending generally parallel to the card panel 60 and adapted to receive a pivot pin or trunnion 36 formed on batten 20. The pivot pin 36 may slide in the groove 172 between one edge 172a of the groove 172 and another edge 172b while still permitting panel 60 to pivot.

Card panel 60 is further formed with an extension 174 which is generally co-planar with the front surface 60a of card panel 60 and extends beyond boss 171. This extension 174 has a shoulder portion 175 as well as a flange 176 at its distal end adapted, in a manner described below, to support the card panel 60 in both an open and a closed position.

A concave bezel 84 is formed at each end and adjacent its lower edge with an extension 90a having a bore or groove adapted to receive a pivot pin 20a of a batten 20. Bezel 84 at its opposite edge is (in its closed position) secured to an end of batten 20 by a screw 83 or other suitable removable securing means. Bezel 84 is formed with an inwardly extending wall 88a terminating in a flange 181 forming a seat in the edge of wall 88a which receives one edge of a reflector 106a.

The reflector 106a is formed with a double concave surface 180 preferably in the shape of a double generally ellipsoidal trough having a small extension flange 182 at one edge. Flange 182 is adapted to engage the terminal edge of wall 88a of bezel 84 when the bezel 84 is in a closed position as seen in FIG. 4. Reflector 106a is further formed at its other edge with a T-shaped termination 184. One leg of the T-shaped termination 184 forms a ledge 186 which engages a flange 105 of bezel 84, disposed on the distal edge of a continuation 104a of the bezel 84. The reflector termination 184 also has a second leg 188 spaced from the upper edge of panel 60 (when in the closed position) which forms a groove 187 adapted to hold a top edge of a car card 56 as shown in FIG. 4. Leg 188 of reflector termination 184 has a ridge or rib 190 extending upwardly which, as described below, engages the upper edge of the card panel 60 in combination with a bump or rounded ridge 192 extending along reflector 106a.

In use, by removing screw 83, bezel 84 is permitted to swing about pivot 22a to the open position shown in dotted lines in FIG. 4. It will be maintained in that position by its weight hanging from the pivot pins. In this way, ready access is given to the fluorescent tube and sockets, for maintenance when needed.

The bezel 84 is formed also with longitudinal grooves 193 into which may be slid the edges of a diffuser or lens 195, which is retained in the bezel 84, both in its open and closed positions.

As seen in FIG. 4, when the lower edge of card panel 60 is engaged by a screw or other removable securing means, pivot pin 36 is adjacent edge 172a of pivot bore 172. At the same time, the flange 176 of card panel 60 supports an upper edge of card panel 60 on rib 190 formed in reflector 106a.

In accordance with this embodiment of the invention, access to an air plenum 118 above card panel 60 is obtained by releasing the lower edge of card panel 60 from the batten 20, as in the previous embodiments. Then, by sliding the panel leftward so that pivot pin 36 engages edge 172b of bore 172, the flange 176 is withdrawn from between rib 190 and rounded ridge 192 permitting rotation of the card panel 60 about pivot pin 36 to an open position as shown in FIG. 5.

As card panel 60 is pivoted, the flange 176 of extension 174 travels through an arc, along an arched surface 32 of batten 20 toward a groove 34a. As card panel 60 is pivoted near its fully open position, flange 176 flexes slightly in arched surface 32 and snaps into groove 34a, permitting flange 176 to return to its natural unflexed shape. Once flange 176 has entered groove 34a, flange 176 will support card panel 60 in an open position, with pivot pin 36 bearing against edge 172b of groove 172. Panel 60 may be closed by reversing this operation, by causing flange 176 to flex as it exits groove 34a and return to an unflexed state within arched surface 32. By pivoting the panel 60, its flange will engage rib 190. Then by sliding the panel over pivot pin 36, it is engaged between rib 190 and rounded ridge 192. By securing the lower edge of panel 60 to batten 20 (not shown in this figure), the panel 60 is secured in this position.

The reflector 106a is secured at each end to a respective batten 20 and extends longitudinally between the two battens, generally coextensive with the card panel 60 and bezel 84. Batten 20 may be further formed with a lip 200 to hingeably secure one margin of each end of reflector 106a. An opposite margin of reflector 106a may have a stub 206 secured in a groove formed by a lip or tab 204. As shown in FIG. 6, reflector 106a may be adapted to hingeably mount on batten 20 and have its stub 206 flexibly urged into a slot formed by tab 204 or may be positioned in slot 204 and around lip 200 upon assembly. Once inserted, stub 206 serves to resist withdrawal of reflector 106a from the slot. Reflector 106a may additionally be secured in any other suitable manner, such as by one or more screws.

FIG. 7 shows an enlarged view of a portion of two adjoining battens 20a, 20b of two adjoining fixtures. The left-hand batten 20a is formed with an extension 21 having a mounting for an electrical connector 17b formed at the outer end of extension 21. The mounting is formed so that connector 17b having a groove 25 in its side may be securely retained on extension 21 by means of a pair of locking fingers (not shown) which engage groove 25. The locking fingers are elastically flexible and arranged so that as connector 17b is inserted into the mounting, the fingers are urged apart until connector 17b is fully inserted at which point the fingers engage groove 25 and thereby return to their unbiased state while retaining the connector. Connector 17b is arranged to mate with a connector 17a formed on one end of a ballast 16 when inserted in the direction of arrow E in the batten sleeves 24a. One of the connector 17a and connector 17b is a male-type connector while the other is a female-type connector. This provides for ready connection, maintenance and replacement of the ballast 16.

Extension 21 is formed with a length sufficient so that a single-lamp ballast with a connector 17a will have an opposite end substantially contained within sleeve 24a. This permits an end lighting fixture in an odd-numbered series of such fixtures to hold a ballast. Where a dual lamp ballast is used to serve adjoining light fixtures 10, the ballast may extend beyond sleeve 24a of one lighting fixture into a second sleeve 24a of an adjoining lighting fixture. Although the dual lamp ballast may extend beyond one fixture into another, it would still be contained in an air plenum defined by the adjoining fixtures. Both adjoining light fixtures may be electrically connected by wires 23 to the dual lamp ballast.

The connector 17b is wired at certain terminal locations to select one of two lamp output options provided by ballast 16. One output option provides full current to the lamps for maximum light intensity. A second output option provides reduced current to the lamps to save power.

Sleeve 24a may be further formed with a locking finger 27 extending away from one of its sleeve walls 24 adapted to lockably engage an end of ballast 16 opposite connector 17a when the ballast is inserted into sleeve 24a in the direction of arrow E. This would secure ballast 16 in sleeve 24a. Alternatively, ballast 16 could be retained in sleeve 24a by locking means associated with each of connectors 17a, 17b or could be retained in any other suitable manner, such as one or more set screws.

It will be readily appreciated that the pivot pins 36 and pivot holes 72, 80, and the pivot pins 36 and pivot holes 172, could readily be interchanged, putting the hole in the batten and pin on the panel 60 or bezel. Other pivot arrangements may be used, such as a metal pin extending between a hole or recess in the batten and in the bezel or card holder panel. Also, the boss on the panel containing the pivot hole (or pin) may extend from either the front or the rear surface of the panel or bezel or be intermediate those surfaces. The boss may extend the entire length of the panel. Similarly, the pivot boss on the bezel may extend for its entire length.

Enhanced structural integrity may be achieved by including braces or webs about the pivot holes or pins and on various flanges such as flange 26 as shown in FIG. 6. The card panel 60 is provided with ribs or flanges 61 spaced along its length extending rearward from a rear surface 60b to enhance the strength of the panel. A boss 71 is formed on ribs 61 near an upper edge of card panel 60. At each end of card panel 60, boss 71 is formed with a pivot hole 72 adapted to receive a pivot pin or trunnion 36 formed on batten 20.

Card panel 60 is of a length sufficient to accommodate standard length light tubes 14 between the sockets mounted on the battens including, for example, four foot tubes.

Shorter length tubes can be accommodated by a secondary cut and punch operation where the panel is cut along the outside margin of a rib 61 and a hole is punched in boss 71 for receiving pivot pin 36. Ribs 61 are generally spaced one foot apart to facilitate cutting panel 60 to house shorter length light tubes, such as a three foot tube.

While FIG. 1 shows three openings in the bezel, in any of the forms of the invention, the bezel may be formed either with a single opening or with a plurality of openings along its length. The strips 87 joining the upper and lower edges of the bezel openings will serve to provide increased strength and rigidity for the bezel and to baffle linear glare. The spacing between adjoining strips 87 is selected to give a desired glare reduction effect in the longitudinal direction. This spacing may, for example, be 4 to 8 inches. In any of the forms of the invention, the lens may, for convenience, extend for substantially the entire length of the bezel, or alternatively, there may be a separate lens element for each bezel opening or group of openings.

The battens, panel, and bezel may be formed by compression or injection molding from plastic materials of suitable strength. Alternatively, the bezel and panel may be extruded or pultruded, in which case the pivot hole bosses may extend the length of the bezel and panel, with pivot holes formed in their ends. The lens or bezel opening or openings may be formed thereafter.

From the foregoing description, it will be clear that the present invention may be embodied in other specific forms without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed as the invention is:

1. A lighting arrangement for the interior of a vehicle comprising:

a first and a second adjacent lighting fixtures placed end-to-end, each fixture including a fluorescent light tube said first fixture having a first rigid unitary mounting batten at its end adjacent said second fixture, said second fixture having a second rigid unitary mounting batten at its end adjacent said first fixture, each batten being adapted to be secured to the structure of said vehicle in a generally vertical orientation for mounting said fixtures to said vehicle structure, said first batten having a first electrical connector mounted thereon, said second batten having a ballast mounted thereon, said ballast having a second electrical connector mounted thereon and mating with said first electrical connector, said ballast being connected to both of said light tubes for initiating and maintaining light discharges therein.

2. A lighting fixture as in claim 1, further including an electrical socket mounted on each of said battens and a respective one of said fluorescent light tubes engaging each of said sockets.

3. A lighting fixture as in claim 2, further including a reflector supported by said battens behind each of said light tubes.

* * * * *